Oct. 27, 1970 K. CHMILLON 3,536,824

REGISTRATION ARRANGEMENT FOR TELEVISION PICKUP TUBES

Filed Jan. 2, 1968 2 Sheets-Sheet 1

Inventor:

Klaus Chmillon by Michael S. Striker

Attorney

REGISTRATION ARRANGEMENT FOR TELEVISION PICKUP TUBES

Filed Jan. 2, 1968 2 Sheets-Sheet 2

Inventor:
Klaus Chmillon
by [signature]
Attorney

United States Patent Office 3,536,824
Patented Oct. 27, 1970

3,536,824
REGISTRATION ARRANGEMENT FOR TELEVISION PICKUP TUBES

Klaus Chmillon, Darmstadt, Germany, assignor to Fernseh GmbH, Darmstadt, Germany Filed Jan. 2, 1968, Ser. No. 695,280
Claims priority, application Germany, Dec. 30, 1966, F 51,127
Int. Cl. H04n 9/08
U.S. Cl. 178—5.4 2 Claims

ABSTRACT OF THE DISCLOSURE

An electronic arrangement for automatically stabilizing the position of the screen within a television pickup tube. A predetermined picture surface is designated upon a photoelectrode within the television pickup tube. At the horizontal and/or vertical edges of the predetermined picture surface, brightness markings are produced by a light source. The video signal which is produced from scanning the screen is filtered to filter out the pulse signal generated from the presence of the brightness markings. The outputs of the filter are applied to a comparator which has as one input a reference signal which is dependent upon a screen parameter such as the picture synchronizing pulse. The result of comparing the output of the filter with this reference signal is applied as a regulating signal for stabilizing the position and/or amplitude of the screen.

BACKGROUND OF THE INVENTION

In video or picture pickup tubes the main problem is to scan an optical picture section as precisely as possible through the use of an electron beam made movable by deflection fields. The position and magnitude of the scanning grid depends as conventionally known, upon the average value of the D.C. current and the amplitude of the vertical or horizontal deflection arrangement. These parameters and magnitudes do not remain constant as a result of the instability of the associated circuit elements with regard to temperature variations and operating voltage variations. The position of the grid does not, therefore, coincide with the picture section. Consequently, corrections must be applied, and these usually during the operation of the camera. In color cameras a particular disturbing effect is realized when grid coverage appears to be insufficient. For the purpose of avoiding undesirable color effects and blurriness of the picture, it is essential to have a large number of setting knobs. The functions of these setting or regulating knobs are interrelated and this causes the correction to become rather laborious to apply.

As a result of the present invention a stabilization system is realized in an automatic manner for coincidence between the picture section and the grid. The same situation applies to different grids and a predetermined grid. Accordingly, any adjustment that may be subsequently required is made simple and will, in general, be superfluous.

Further features of the stabilization system, in accordance with the present invention reside in the additional video signal amplification. The design applies particularly to a number of picture channels, especially color channels.

In Braun tubes with electrostatic deflection, a procedure has been disclosed in which the deflection amplitude is maintained and limited to a constant value in the line direction. In this procedure an electrode was arranged at the edge of the picture field, so that a signal would be emitted upon the impingement of the scanning beam. This signal was used to execute the return path of the scanning beam. Other arrangements of this type reside in the use of an illuminating line which, when illuminated by the electron beam causes a signal to be produced by a photoelectric cell arranged at the edge of the picture. This signal is then used to execute the resetting operation. In this manner the grid becomes automatically limited to the auxiliary arrangement.

The preceding arrangements, however, are intended solely for picture receiving tubes, and have been described for purposes of indicating the manner in which the deflection process is produced. In this deflection process a direct coupling between the deflection plates and the auxiliary device prevailed. These arrangements require special construction of the cathode ray tube. The arrangement in accordance with the present invention provides for automatic stabilization of the position of a screen which is written upon by a scanning beam in picture pickup tubes. The stabilization is a function of the position of a predetermined picture or given picture upon the photocathode of the tube. The surface within the horizontal and/or vertical borders of the given picture are covered by the scanning beam. One or more illuminated markings are provided outside of the region used for purposes of picture transmission. These markings produce a separated pulse signal from the video signal of the television picture. It is also provided in accordance with the present invention that the pulse signal is filtered from the signal resulting from the scanning and is passed on to a coincidence or phase comparison circuit. The signal against which the comparison is made within the comparison circuits is one which is a function of the grid or screen generation as, for example, line and/or picture synchronizing pulse. The output of the comparison circuit is in the form of a D.C. voltage and is used to influence the grid or screen position and/or the amplitude. The influence is such that a position and magnitude of the grid or screen is stabilized as a function of the markings. In an advantageous design, these markings are in a plane which is an intermediate image plane within the optical system of the camera and is a plane provided with a picture mask. In this manner the markings and the borders of the mask are sharply imaged upon the plane of the photocathode of the camera tube.

As a result of the present invention considerable simplifications are made available for the correction of amplitude and position deviations of one or more different picture pickup tubes having screens or grids written upon it. The present invention is particularly aimed at a plurality of color camera tubes within a color camera. In a conventional three tube camera, approximately 40 regulating knobs have been required. These knobs have been interdependent and were required to be set in a stepwise manner. The number of these regulating devices may now be reduced to 2 times 2 linearity regulating devices. Further design improvements may be realized when the necessary light markings, which are arranged within a strip at the edge of the picture area, are used for the purpose of producing a reference black value. At the same time, the color temperature in brightness of the markings may be selected so that regulation of the video signal amplification may be realized through optical comparison with an amplitude of 100% white.

SUMMARY OF THE INVENTION

An electronic arrangement used in conjunction with video pickup tubes for automatically stabilizing the position of the scanned screen with respect to the position of a predetermined picture surface on the photoelectrode within the video pickup tube. An adjustable light source produces brightness markings along the horizontal and/or vertical edges along the border of the predetermined picture surface. The scanning beam which scans the screen and produces a video signal is applied to a filter. The latter filters from the video signal the pulse signal which is generated as a result of the brightness markings. The output of the filter is applied to a comparator, which has also applied to it, a reference signal depending upon a screen parameter such as, for example, line or picture synchronizing pulse signals. The output of the filter is compared with this reference signal within the comparator. The result of this comparison appears as a DC signal at the output of the comparator, and is used for regulating the position of the screen in reference to the brightness markings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
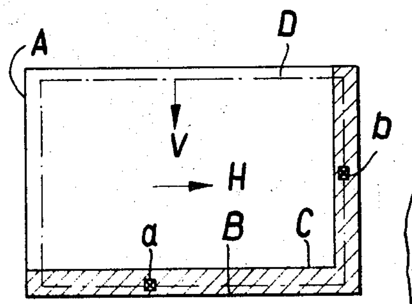
FIG. 1 is a functional layout schematic of a screen related to a video pickup tube.
Figure 1A:
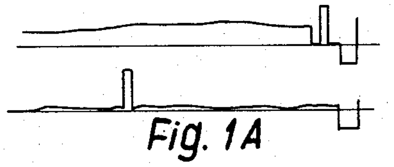
FIG. 1A is a pulse signal diagram showing the signal wave form prevailing on the screen of FIG. 1.

Referring to the drawings and, in particular, to FIG. 1, area D represents a picture section of a picture area produced by, for example, through the optical system of a photo-cathode of a picture pickup tube, such as a vidicon tube. The area D can, for example be provided by a picture mask in the path of the optical beam. A surface A is scanned by the scanning beam of the tube. However, only the region C of this area A is used for picture transmission. The shaded portion B is suppressed through the blanking of the vidicon amplifier. The time interval for the reset or flyback of the beam also is within the blanking time during which the beam is blanked. Accordingly, the signal appearing at the output of the picture pickup tube contains a timing portion corresponding to the shaded region B. This portion of the signal is not used for the purpose of transmitting the television signals and it is therefore available for controlling purposes. This time interval corresponds somewhat to the gaps or blanks of the pulse signals. In accordance with the present invention, this time interval is used to stabilize and correct the location of the screen in the desired manner. The arrangement may be such that signal markings are located at the positions *a* and *b* within the shaded region C. The brightness of these signal markings may, for example, be 100% white or some value above this. The markings are not visible in the television picture since they lie in the blanked out region B. These markings do, however, give rise to pulses which are separated by a gating circuit before the blanking period and transmitted to a control circuit. FIG. 1A shows the position of the pulses produced by the light markings *a* and *b*. The pulses or pulse signals are shown in the form of two picture signal trains. One line of the signal train corresponds in height to the marking *b*, whereas the other line of the signal train corresponds in height to the marking *a*.

Figure 2:
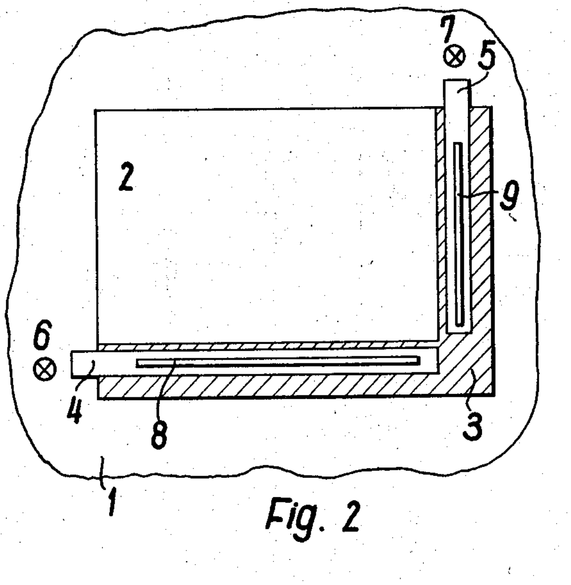
FIG. 2 shows a mechanical arrangement for locating a mask within the optical path of the beam within the video pickup tube, and shows the brightness markings at the picture edges, in accordance with the present invention.

FIG. 2 shows the construction of a picture mask with light markings. In this figure the masking arrangement is designated by the reference numeral 1. The masking arrangement may, for example, consist of a screen situated in the path of the optical beam and having a rectangular opening 2. Two light conductive members 4 and 5 made, for example from plexiglass, are situated below and along the side border of the opening within the shaded or cross-hatched region 3. This region corresponds somewhat to the sampling region B of FIG. 1. The light conductive members 4 and 5 are illuminated at one end with the lamps 6 and 7. The two light conductors are covered with the exception of the slits 8 and 9. These slits are parallel and perpendicular to the line direction. As a result of the illumination of the light conductors 4 and 5 through means of the lamps 6 and 7, light marks in the form of illuminated lines appear parallel to the edges of the mask 1. These light marks or illuminated lines are imaged upon the photo-cathodes of the picture pickup tube.

Figure 3:
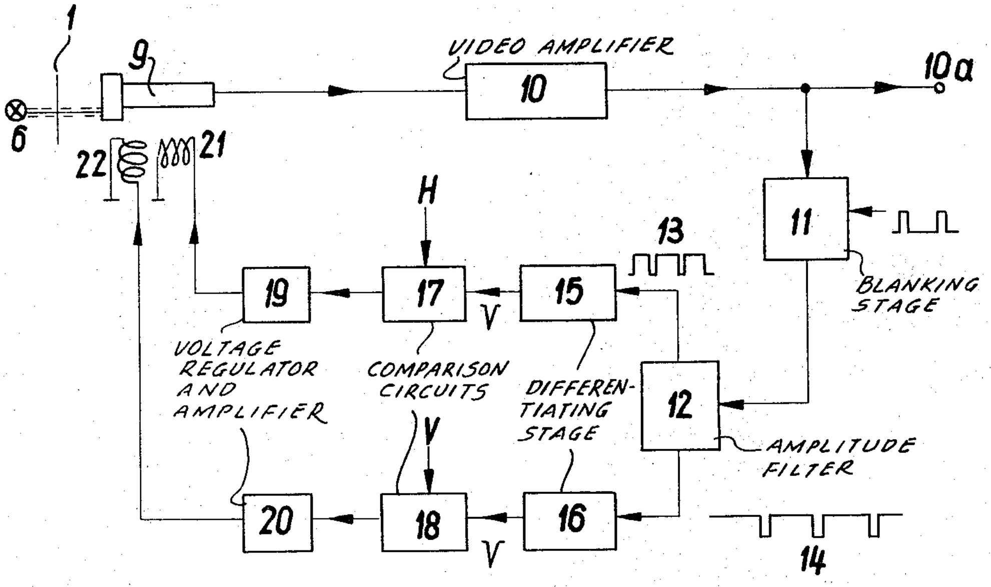
FIG. 3 has a photo-cathode upon which light markings are for processing the marking signals included in FIG. 2 for the purpose of regulating the position of the screen.

FIG. 3 shows an arrangement in block form for stabilizing the grid position in the vertical and horizontal directions. This stabilization is automatically derived from the light markings. The picture pickup tube 9 in FIG. 3 has a photo-cathode upon which light markings are produced with the aid of the mask 1 and a lamp 6, in accordance with FIG. 2. Signals from the output of the picture pickup tube are transmitted to a video amplifier 10 and subsequently, in turn, to the output **10*a*. The television signals are taken from this output 10*a*** and applied to the conventional apparatus for further processing.

The signals appearing at the output of the amplifier 10 are also applied to a blanking stage 11. This blanking stage suppresses the picture signals to the shaded or cross-hatched region B in FIG. 1. An amplitude filter 12 separates the pulse signals derived from the blanking stage 11 into H and V frequency pulse trains. These pulse trains are designated by the reference numerals 13 and 14, respectively. After passing these pulse trains through differentiating stages 15 and 16, they are applied to phase comparison circuits 17 and 18. Signals H and V to which the pulse trains are to be compared, are applied to the comparison circuits 17 and 18. The outputs of the comparison circuits 17 and 18 each provide a DC signal having a magnitude proportional to the phase shift of the marking signal with respect to the H or V signal.

By applying a predetermined voltage potential it is possible to realize an arrangement wherein the outputs of the stages 17 and 18 provide a null voltage level when the marking signals have a desired relationship. The DC voltage signals from the comparison circuits 17 and 18 are amplified by the voltage regulators and amplifiers 19 and 20, and then applied to position coils 21 and 22 located within the neck of the picture pickup tube. Therefore, when the grid deviates from its desired position, the scanning electron beam becomes deflected so that the control voltage is made smaller. The time constants of both of the regulating circuits may be selected sufficiently large so that an observer looking at the television screen would not be aware of the resulting grid shifting or deviation. A limiting stage may be inserted into the path of the output of the differentiating stage for the purpose of limiting the amplitude or magnitude of the output of these differentiating stages. In this manner there is no dependency upon the variations in the light sources serving the purpose of illuminating the markings.

When the grid of a plurality of tubes is to be covered, then it is possible to feed in the marking signals from a comparison tube instead of the H and V signals from the pulse comparison stages 17 and 18. αhus, it is possible, for example, to use the tube for the green channel as a reference tube, and to apply the resulting marking signals to the regulating circuits for the tubes associated with the blue channel and the red channel. Instead of using special position coils 21 and 22 for the picture pickup tube, it is also quite possible to insert these regulating signals into the circuit for the positioning of the picture pickup tubes. It is further possible to effect the magnitude of the amplitude regulation in the H direction through means of a small control choke. For the regulation of the V amplitude, a variable resistor may be applied. When it is desired to attain regulation of the deflection amplitude in the H and V directions, the circuit shown in FIG. 3, may be considerably useful. Which one of the two arrangements is to be used for limiting the line shaped light markings for regulating the individual parameters, depends on the individual factors in the case.

Figure 4:
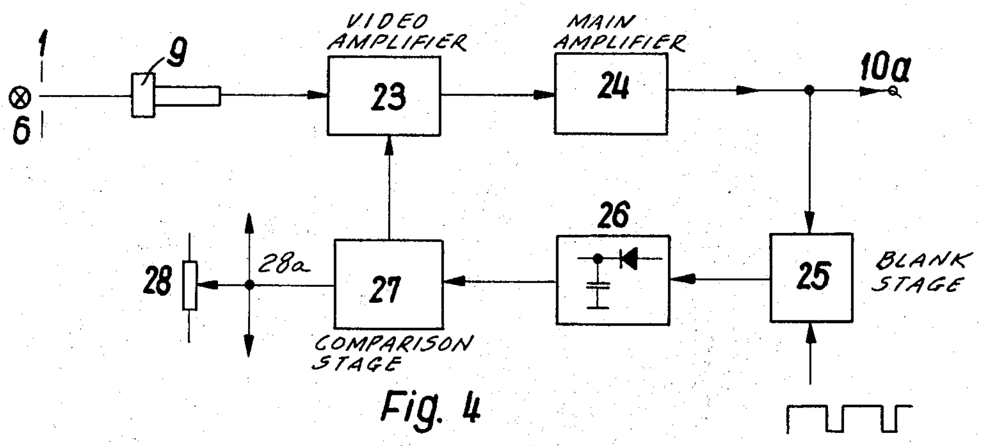
FIG. 4 is a functional block diagram of an arrangement for regulating the amplification of the video signal with the aid of the marking signals.

The arrangements described above when used in conjunction with auxiliary circuitries can also be used for maintaining automatically constant the video amplification. The two identical light markings may be used for this purpose. This is of special significance in color cameras since automatic white matching of the individual color channels may be achieved with the aid of this arrangement. The magnitude of the reference voltage used in this regard, is fixed and the same for all channels. An arrangement of this type, is shown in FIG. 4. In this representation, only one of a plurality of color channels is shown. In this figure, the mask is again represented by the reference numeral 1, and the lamp 6 is used to produce a light mark at the edge of the photo-cathode of the pickup tube 9. Within the transmissioned path of the video signals appearing at the output of the tube 9, are a regulated video amplifier 23, and a subsequent main amplifier 24. The signals transmitted from the amplifier 24 are applied to both an output 10*a* and a blanking stage 25. The remaining pulse signals reach a comparison stage 27. In the latter stage, the resulting DC voltage is compared with a voltage of the designed magnitude. A potentiometer 28 provides the magnitude of the desired voltage against which the pulse signals from the blanking stage 25 are to be compared. The voltage representing the difference of the two signals being compared, is applied as a regulating voltage to the stage 23 or the video amplifier. The desired voltage provided by the potentiometer 28 is also transmitted to the comparison stages of the other color channels. This feature is shown by the signal junction 28*a* at the output of the wiper arm of the potentiometer 28.

If, now, the illumination of the markings is such that the color temperature corresponds precisely to the predetermined color temperature, then it is possible to set conveniently the amplifying value for 100% white through means of the potentiometer 28. Thus, all color channels may be simultaneously set thereby. If, now, for example, a color channel requires that a new tube be inserted, the amplification of this circuit is regulated so that the white balance is retained even when the new tube has a different sensitivity.

The ilumination of the markings for all pickup tubes of the camera can, of course, be produced of a single light source. The arrangement of the markings within the optical path of the beam can be selected so as to result in the most advantageous construction. Thus, the markings may be inserted at any location within the beam through, for example, the medium of a mirror. It is only necessary to retain the condition that the brightness markings produced upon the photo-cathode have the correct relationship with respect to the grid written by the cathode ray beam.

The procedure described above for automatically correcting the position and amplitude of the grid, may also be applied to a scanning process in which two or more grids are written upon a picture pickup tube.

Figure 5:
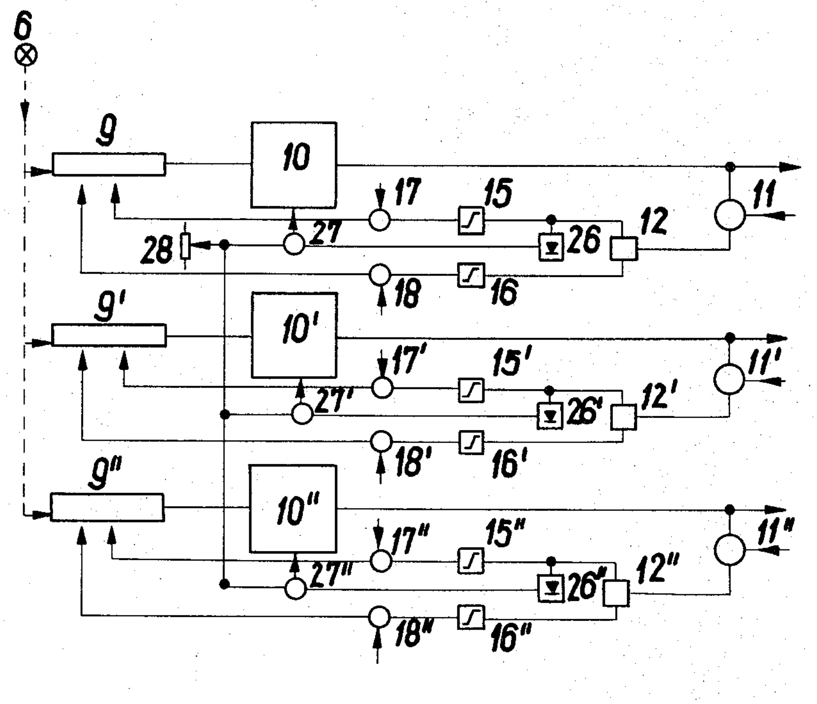
FIG. 5 is a functional block diagram and shows an arrangement which combines the circuits of both FIGS. 3 and 4, in accordance with the present invention.

FIG. 5 is used to describe the procedure by which the arrangement of FIG. 4 is used for additional regulation of the amplifier in the color camera having three color channels. The reference numerals in this FIG. 5 are identical with those shown in FIG. 3. By means of the lamp 6, light markings are applied to the pickup tubes 9, 9′, and 9″. These light markings are then further transmitted from the outputs of these pickup tubes in the form of pulse signals. The pulse signals are separated in the separating stages 11, 11′, 11″, and subdivided into H and V frequencies in the stages 12, 12′, and 12″. After being limited by the stages 15, 15′ and 15″, as well as stages 16, 16′, and 16″, the resulting signals are applied to the comparison stages 17, 17′, 17″ and 18, 18′, and 18″. In these comparison circuits the signals are compared with synchronizing signals of H and V frequencies. The resulting DC signals are then applied to the tubes 9, 9′ and 9″, as shown by the lines and arrows, for the purpose of automatically regulating the position of the grid.

Limiting stages 26, 26′ and 26″ are used to limit the pulse stikes of, for example, the H marking signals. The limited signals from the limitors 26, 26′ and 26″ are subsequently applied to the comparison stages 27, 27′ and 27″. The signals applied to the inputs of these comparison circuits in this manner, are compared to predetermined DC signals provided by a potentiometer 28. The difference signal or the output of the comparators 27, 27′ and 27″ are applied, in the form of a DC voltage, to the video amplifier 10, 10′ and 10″. As a result, a color camera is obtained with grid and white stabilization features.

It will be understood that each of the elements described above, or two or more together, may also find a useful application in other types of colored television tubes differing from the types described above.

While the invention has been illustrated and described as embodied in colored television tubes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. A stabilization arrangement in a video pickup tube for automatically stabilizing the position of a scanned screen, comprising, in combination, a photoelectrode within said video pickup tube and having a predetermined picture surface; light source means for producing brightness markings along at least two edges of said predetermined picture surface; scanning means for scanning said screen and producing a video signal; filtering means for filtering from said video signal the pulse signal generated by said brightness markings while scanning said screen; comparison means connected to the output of said filtering means and having a reference signal dependent upon the picture synchronizing pulse signal, the output of said filtering means being compared with said reference signal; means connected to the output of said comparison means for regulating the position of said scanning pattern in reference to said markings, whereby the position of said pattern is stabilized in reference to the position of said predetermined surface on said photoelectrode; optical transmission means having a plane in which an intermediate image is formed; picture mask means within said plane and having at least one horizontal and vertical edge provided with a line-shaped light source, said light source comprising light conducting means; incandescent lamp means for illuminating said light conducting means; a plurality of $n$ screens to be stabilized in reference to said predetermined picture surface; and $n-1$ comparison circuit means having as one input a signal representing the markings of the screen to be stabilized and having a second input representing reference markings within said reference signal, the brightness of said markings on said screen being set to 100% of the brightness of said video signal, the amplitude of said markings providing a regulating signal for stabilizing the video amplification.

2. A stabilization arrangement in a video pickup tube for automatically stabilizing the position of a scanned screen, comprising, in combination, a photoelectrode within said video pickup tube and having a predetermined picture surface; light source means for producing brightness markings along at least two edges of said predetermined picture surface; scanning means for scanning said screen and producing a video signal; filtering means for filtering from said video signal the pulse signal generated by said brightness markings while scanning said screen; comparison means connected to the output of said filtering means and having a reference signal dependent upon the picture synchronizing pulse signal, the output of said filtering means being compared with said reference signal; means connected to the output of said comparison means for regulating the position of said scanning pattern in reference to said markings, whereby the position of said pattern is stabilized in reference to the position of said predetermined surface on said photoelectrode; optical transmission means having a plane in which an intermediate image is formed; picture mask means within said plane and having at least one horizontal and vertical edge provided with a line-shaped light source, said light source comprising light conducting means; incandescent lamp means for illuminating said light conducting means; a plurality of $n$ screens to be stabilized in reference to said predetermined picture surface; and $n-1$ comparison circuit means having as one input a signal representing the markings of the screen to be stabilized and having a second input representing reference markings within said reference signal, the brightness of said markings on said screen being set to 100% of the brightness of said video signal, the amplitude of said markings providing a regulating signal for stabilizing the video amplification, the color temperature of said markings being set to the color temperature of the illumination of the object scene being picked up by said video pickup tube.

References Cited

UNITED STATES PATENTS

| | | | |
|---|---|---|---|
| 2,769,855 | 11/1956 | Boothroyd et al. | 178—5.4 |
| 3,389,294 | 6/1968 | Shaw | 315—19 |
| 3,404,220 | 10/1968 | Favreau | 178—5.2 |

ROBERT L. RICHARDSON, Primary Examiner

U.S. Cl. X.R.

178—7.2